United States Patent
Rocher et al.

(10) Patent No.: US 12,384,558 B2
(45) Date of Patent: Aug. 12, 2025

(54) METHOD AND SYSTEM FOR DETECTING A HARD LANDING

(71) Applicant: AIRBUS HELICOPTERS, Marignane (FR)

(72) Inventors: Antonin Rocher, Ensues-la-Redonne (FR); Roland Becquet, Meyreuil (FR)

(73) Assignee: AIRBUS HELICOPTERS, Marignane (FR)

( * ) Notice: Subject to any disclaimer, the term of this patent is extended or adjusted under 35 U.S.C. 154(b) by 85 days.

(21) Appl. No.: 18/396,796

(22) Filed: Dec. 27, 2023

(65) Prior Publication Data

US 2024/0327028 A1  Oct. 3, 2024

(30) Foreign Application Priority Data

Mar. 31, 2023  (FR) ...................... 2303178

(51) Int. Cl.
  *B64D 45/00*  (2006.01)
  *B64C 25/00*  (2006.01)

(52) U.S. Cl.
  CPC ............ *B64D 45/00* (2013.01); *B64C 25/001* (2013.01); *B64D 2045/008* (2013.01)

(58) Field of Classification Search
  CPC .................................................... B64D 45/00
  See application file for complete search history.

(56) References Cited

U.S. PATENT DOCUMENTS 3,712,122 A  1/1973  Harris et al.
5,214,586 A  5/1993  Nance
6,676,075 B2  1/2004  Cowan et al.
7,589,645 B2  9/2009  Schmidt
(Continued)

FOREIGN PATENT DOCUMENTS

CA  2620188 A1  3/2007
EP  4015373 A1  6/2022
(Continued)

OTHER PUBLICATIONS https://www.atr-aircraft.com/fr/presspost/atr-et-safran-developpent-smart-lander-un-service-revolutionnaire-danalyse-des-atterrissages-durs on Jan. 9, 2023.
(Continued)

*Primary Examiner* — Joseph H Feild
*Assistant Examiner* — Pameshanand Mahase
(74) *Attorney, Agent, or Firm* — BROOKS KUSHMAN P.C.

(57) ABSTRACT

The present disclosure relates to a method for detecting a hard landing comprising: i) determining three ground components of a ground reaction force, and determining, for each connector of a landing gear, three attachment components of a force applied to this connector, ii) determining whether a ground stress point defined by the three ground components lies within or outside a ground dimensioning envelope, and, for each connector, whether an attachment stress point defined by the three corresponding attachment components lies within or outside an attachment dimensioning envelope, iii) determining that a hard landing has been made when at least the ground stress point lies outside the ground dimensioning envelope or at least one attachment stress point lies outside the corresponding attachment dimensioning envelope.

14 Claims, 5 Drawing Sheets

(56) References Cited

U.S. PATENT DOCUMENTS

| | | | |
|---|---|---|---|
| 10,670,106 B2* | 6/2020 | Ericksen | B60G 17/01908 |
| 2007/0008187 A1* | 1/2007 | Schmidt | B64C 25/001 |
| | | | 340/970 |
| 2011/0046825 A1 | 2/2011 | Lastere et al. | |
| 2011/0231037 A1 | 9/2011 | Stiharu et al. | |
| 2019/0232748 A1* | 8/2019 | Mohamed | B60G 17/0165 |
| 2020/0023703 A1* | 1/2020 | Tsuchizawa | B62K 25/08 |
| 2021/0048332 A1* | 2/2021 | Nance | G01G 19/028 |

FOREIGN PATENT DOCUMENTS

| | | |
|---|---|---|
| FR | 2931553 B1 | 11/2009 |
| IN | 2013CH02074 A | 5/2013 |
| WO | 2007023280 A1 | 3/2007 |

OTHER PUBLICATIONS

French Search Report for French Application No. FR2303178, Completed by the French Patent Office, Dated Oct. 11, 2023, 10 pages.

\* cited by examiner

METHOD AND SYSTEM FOR DETECTING A HARD LANDING

CROSS-REFERENCE TO RELATED APPLICATIONS

This application claims priority to French patent application No. FR 23 03178 filed on Mar. 31, 2023, the disclosure of which is incorporated in its entirety by reference herein.

TECHNICAL FIELD

The present disclosure relates to a method and a system for detecting a hard landing, and an assembly comprising such a system and an aircraft.

BACKGROUND

Aircraft certification regulations define a type of landing referred to as a "hard landing" in the terminology of a person skilled in the art. Following a hard landing, the aircraft must be inspected in order to repair possible damage resulting from the landing.

A hard landing can normally be signaled by a pilot. However, a pilot's perception may prove to be inaccurate. Therefore, various systems are known for detecting a hard landing.

Document U.S. Pat. No. 7,589,645 B2 describes an aircraft system comprising a means for measuring and storing data from acceleration sensors and gyroscopes. The system further comprises means for comparing the stored data with at least one threshold. If the threshold is passed, the data received from the acceleration sensors and gyroscopes must be analyzed to determine whether a hard landing has occurred.

According to another technique, an aircraft may comprise a landing gear provided with a mechanical fuse configured to break in the event of a hard landing.

Document U.S. Pat. No. 6,676,075 B2 describes a method for detecting a hard landing based on analog signals emitted by transducers arranged on components of an aircraft. Transducers may be arranged on bolts linking a landing gear to a load-bearing structure of the aircraft, a wing panel or a landing gear beam.

Document U.S. Pat. No. 3,712,122 A also describes transducers arranged on landing gears.

Document U.S. Pat. No. 5,214,586 describes a hard landing indicator that generates an alert when the pressure from a landing gear exceeds a limit.

Document CA 2 620 188 A1 describes a landing gear that has a first pair of lower wheels and a second pair of upper wheels. A monitoring device comprises a pressure sensor for measuring the pressure of a hydraulic fluid in an articulated leg of a landing gear. Moreover, the monitoring device comprises a first sensor for sensing and indicating that the landing gear is lowered, a second sensor for detecting, sensing and signaling the start of a first operating mode wherein the first pair of lower wheels touches the ground, and a third sensor for detecting and signaling the start of a second operating mode when the second pair of upper wheels also touches the ground.

Document IN 2013CH02074 A suggests detecting that landing has taken place by monitoring the pressure in a landing gear shock absorber.

Monitoring a parameter and comparing its value to a threshold is advantageous. However, simply comparing the value of a parameter to a threshold can be approximate. For example, the pressure of a fluid in a landing gear shock absorber can be compared to a threshold. However, this pressure can vary in many ways depending on the landing conditions, in particular depending on the attitude of the aircraft, the vertical speed of the aircraft or load factors.

Document FR 2 931 553 B1 describes a method for assisting in the detection of a hard landing for an aircraft, that comprises determining an instant of impact of an aircraft on a landing strip based on the values of measured parameter. Moreover, this method comprises calculating at least one item of data relating to a structural component of the aircraft by using at least one neural network receiving, as input, estimated values of said parameters at the instant of impact. This item of data is then compared to a threshold value.

The article published online at https://www.atr-aircraft-.com/fr/presspost/atr-et-safran-developpent-smart-lander-un-service-revolutionnaire-danalyse-des-atterrissages-durs on Jan. 9, 2023 refers to a service for diagnosing landing gears based on artificial intelligence, fed with hard landing simulations.

Documents EP 4 015 373 A1, U.S. Pat. No. 6,676,075 B2, U.S. Pat. No. 3,712,122 A, and US 2011/231037 A are also known.

SUMMARY

An object of the present disclosure is thus to propose an alternative method for determining whether an aircraft has made a hard landing.

The disclosure relates to a method for detecting a hard landing, for detecting if a hard landing is made during a landing phase carried out by an aircraft, the aircraft being provided with at least one landing gear comprising at least one contact member coming into contact with the ground during a landing maneuver and at least two connectors connected to a structure of the aircraft, said landing gear comprising a shock absorber containing at least one fluid. The fluid may be a liquid such as oil. The fluid may be subject to throttling during a landing maneuver.

The method for detecting a hard landing comprises carrying out a series of monitoring cycles, each monitoring cycle comprising the following steps:

determining, using a controller, three ground components of a ground reaction force at an interface between the ground and the contact member and along three separate and non-coplanar reference axes respectively, and determining, for each connector, three attachment components of a force applied to this connector along said three reference axes respectively;

determining, using the controller, whether a ground stress point defined by the three ground components lies within or outside a ground volume delimited by a ground dimensioning envelope in a three-dimensional ground diagram, and, for each connector, whether an attachment stress point defined by the three corresponding attachment components lies within or outside an attachment volume delimited by an attachment dimensioning envelope in a three-dimensional attachment diagram specific to it; and determining, during each monitoring cycle or at the end of the monitoring cycles, that a hard landing has been made when at least the ground stress point lies outside the ground dimensioning envelope or at least one attachment stress point lies outside the corresponding attachment dimensioning envelope.

The term "connector" may refer to a joint as such, for example a pivot or ball joint. The term "connector" may also refer to a link within a joint. In the latter case, a pivot joint may be formed by two ball joint connectors.

The expression "for each connector, whether an attachment stress point defined by the three corresponding attachment components lies within or outside an attachment volume delimited by an attachment dimensioning envelope in its own three-dimensional attachment diagram" means that each connector is associated with a three-dimensional attachment diagram and with an attachment dimensioning envelope that are specific to this connector.

Tests, calculations and simulations can be undertaken to certify the aircraft. During these tests and simulations, a manufacturer can determine, for each interface of each landing gear, the forces experienced during various landings and, in particular, during various landings that are bordering on a hard landing. These tests and simulations can be carried out by varying the values of various parameters influencing the type of landing, such as the vertical speed or the attitude of the aircraft, for example. A manufacturer can use these tests and simulations to establish the various dimensioning envelopes delimiting the stress points obtained during normal landing simulations and tests. Therefore, a ground dimensioning envelope delimits the ground stress points that do not require maintenance action due to a hard landing. Similarly, for each connector, an attachment dimensioning envelope specific to this connector delimits the attachment stress points that do not require maintenance action.

The controller is therefore configured to estimate the forces experienced by the landing gear at the interfaces with the ground and a structure of the aircraft along three reference axes, for example of the aircraft. Determining the forces experienced in a reference frame of the aircraft makes it easy to relate them to certification tests and simulations. The ground and attachment components of these forces make it possible to precisely determine whether the landing should be classed as hard or soft, and whether maintenance action needs to be taken.

For each landing phase, this method therefore makes it possible to precisely determine the components of the forces experienced at the interfaces during a plurality of monitoring cycles, and not only at the moment the aircraft touches down, for example. The monitoring cycles may be carried out in real time or after landing. At each monitoring cycle, the method determines whether at least one ground or attachment stress point lies outside the associated dimensioning envelope. If it does, the landing in question is a hard landing.

This method for detecting a hard landing is not limited to a simple comparison at a specific instant, for example comparing a pressure to a threshold at a specific instant. Such a comparison may require a relatively low threshold to be used due to the highly variable landing conditions experienced. Instead, during each monitoring cycle, the controller of the disclosure determines the coordinates of the ground stress point and the attachment stress points to assess whether these ground and attachment stress points lie within, or outside, respective dimensioning envelopes. This method therefore makes it possible to take into account changes in the forces experienced at the interfaces, and consequently the dynamics of the landing.

Moreover, this method for detecting a hard landing may be implemented using relatively simple sensing devices that are already installed on many landing gears and on board many aircraft.

The method for detecting a hard landing may also include one or more of the following features, taken individually or in combination.

According to one possibility, the method for detecting a hard landing may comprise determining, using the controller, whether the coordinates of the ground stress point are the three ground components in the three-dimensional ground diagram and, for each connector, determining, using the controller, whether the coordinates of the associated attachment stress point are the three associated attachment components in the three-dimensional attachment diagram specific to the connector in question.

According to one possibility compatible with the preceding possibilities, the method for detecting a hard landing may comprise generating a maintenance alert with an alerter when it has been determined that a hard landing has been made, or generating a normality alert with the alerter when no ground stress point lies outside the ground dimensioning envelope and no attachment stress point lies outside the corresponding attachment dimensioning envelope.

In this way, a pilot or operator can, when appropriate, be warned that maintenance action needs to be taken.

According to one possibility compatible with the preceding possibilities, the ground and attachment dimensioning envelopes may be stored in a memory of the controller.

According to one possibility compatible with the preceding possibilities, the three reference axes may be a roll axis of the aircraft, a pitch axis of the aircraft and a yaw axis of the aircraft.

The ground and attachment components are thus defined in a reference frame of the aircraft.

According to one possibility compatible with the preceding possibilities, the method for detecting a hard landing may comprise successive measurements, during flight and with a pressure sensing device, of a shock absorption pressure of said fluid, said controller being configured to estimate that said landing phase is beginning when a relative difference between two successive measurements of said shock absorption pressure exceeds a trigger threshold.

For example, when the shock absorption pressure increases by at least 5% between two successive shock absorption pressure measurements, the controller may be configured to deduce that the landing phase of interest is beginning.

According to another example, a switch may be activated when the aircraft has touched down, this switch emitting a signal carrying information signaling this touchdown.

According to one possibility compatible with the preceding possibilities, the method for detecting a hard landing may comprise measuring, with a pressure sensing device, a shock absorption pressure of said fluid during the landing phase, said controller being configured to estimate that said landing phase has ended when at least one of the following conditions is met:
- each landing gear of said at least one landing gear is resting on the ground; and
- said shock absorption pressure for each landing gear of said at least one landing gear is greater than a test threshold that is stored or calculated for a reference period.

The controller may consider that a landing gear is resting on the ground as long as a stabilized state is detected and, for example, as long as the absolute value of a relative difference (expressed as a percentage, for example) between two successive measurements of said shock absorption pressure of this landing gear is less than a stored threshold.

The test threshold may be stored. Alternatively, the test threshold may be calculated. For example, the test threshold to be applied to a landing gear may correspond to a multiple of the shock absorption pressure measured during flight before the landing gear touches down. The test threshold may be calculated as a function of the temperature or other parameters.

According to one possibility compatible with the preceding possibilities, the ground dimensioning envelope may comprise ground dimensioning points and each attachment dimensioning envelope may comprise attachment dimensioning points, each ground dimensioning point representing a maximum force experienced at an interface between the contact member and the ground during a limit landing scenario, and, for each connector, each attachment dimensioning point representing a maximum force experienced by the connector in question during the limit landing scenario.

A manufacturer may carry out or simulate multiple so-called normal landings, i.e., landings that do not require any maintenance action to be taken after landing. The dimensioning points situated at the periphery of the resulting point cloud are connected to obtain a dimensioning envelope.

According to one possibility compatible with the preceding possibilities, said steps of determining, using a controller, three components ground and three attachment components for each connector may comprise the following steps:
  during the current monitoring cycle, measuring, using a pressure sensing device, a shock absorption pressure of said fluid;
  during or outside the landing phase, measuring, using a temperature sensing device, a temperature inside or outside said shock absorber;
  during the current monitoring cycle, measuring, using an operating data sensing device, one or more items of operating data of said aircraft; and
  using the controller, determining, from a stress model taking into account said temperature and said shock absorption pressure and the item or items of operating data, the three ground components and the three attachment components for each connector.

The temperature may be measured with a conventional temperature sensing device measuring a temperature of the fluid in the shock absorber. According to another example, the temperature may be measured outside the shock absorber.

The expression "during or outside the landing phase" means that at least one temperature value is stored, for example the value reached before or at the start of the landing phase, at the end of the landing phase, or the like. The temperature may be considered to be substantially constant during the landing phase. When this is the case, the expression "taking into account said temperature" means that the stress model takes the stored value into account.

Alternatively, several successive temperature values may be stored, in which case the expression "taking into account said temperature" means that the stress model takes the value of the temperature measured during the current monitoring cycle into account.

The stress estimator allows the nature of the landing to be assessed more accurately using not only a simple pressure value but the change in this pressure during the landing phase, as well as one or more values of one or more items of operating data. The expression "operating data" denotes data influencing the behavior of the aircraft or the landing gear or gears and, in particular, inertial data or data having an impact on the inertia of the aircraft. Using these parameters allows the dynamic behavior of the landing gear to be taken into account to determine the type of landing.

Irrespective of how the temperature is processed, during each monitoring cycle, the pressure of the shock absorber fluid and one or more items of operating data are measured and used by the controller.

The stress model may, for example, comprise an artificial intelligence or one or more stored laws. The stress model may be built from tests, calculations and/or simulations. These tests, calculations and/or simulations may cover the whole of the flight envelope certified and defined by one or more certification regulations. In particular, simulations may simulate various landings made with multiple values of one or more parameters. Simulations may, for example, be carried out for landing scenarios that have not been tested in dedicated tests. Each tested or simulated landing scenario may be defined by at least one parameter from the following list: vertical speed, longitudinal speed, lateral speed, the mass of the aircraft, ambient temperature, roll attitude angle, pitch attitude angle, lift, angular speed about a roll or pitch or yaw axis of the aircraft. Finer granularity may be used for the most frequent operational scenarios, or the most severe scenarios, to improve the accuracy of the stress model.

The controller therefore applies the stress model to estimate the ground and attachment components during each monitoring cycle. This method therefore does not require dedicated stress sensors to be used.

According to one possibility compatible with the preceding possibilities, the item or items of operating data may be included in an extensive list comprising: a roll angle of the aircraft, a pitch angle of the aircraft, a yaw angle of the aircraft, an angular roll speed of the aircraft, an angular pitch speed of the aircraft, an angular yaw speed of the aircraft, a longitudinal acceleration along a roll axis of the aircraft, a lateral acceleration along a pitch axis of the aircraft, a vertical acceleration along a yaw axis, a mass of the aircraft, a lift of the aircraft such as, for example, a lift exerted by a rotor, a position of a collective pitch control of a rotor of the aircraft, a position of a cyclic pitch control of a rotor of the aircraft, a position of the center of gravity of the aircraft, an inflation pressure of a tire of said landing gear, a position of a component of said landing gear, a collective pitch angle of blades of a rotor of the aircraft, a swashplate angle of a rotor of the aircraft.

According to one possibility compatible with the preceding possibilities, determining, from a stress model, of the three ground components and the three attachment components for each connector may comprise: (a) determining, with a movement module of the stress model applied by the controller, a length of said shock absorber based on said shock absorption pressure and said temperature; and (b) determining, with a stress module of the stress model, the ground components based on said length and said shock absorption pressure and at least one said item of operating data; and (c) determining, with a transformation module of the stress model, the attachment components based on the ground components.

The stress module and/or the movement module and/or the transformation module may each comprise an artificial intelligence, such as a neural network, for example, at least one mathematical law or the like.

The movement module is used to determine the stroke of the shock absorber, i.e., its length between two reference points during each monitoring cycle. This stroke can be used to estimate the shape of the landing gear during each monitoring cycle. This shape, associated with the shock absorption pressure of the fluid in the shock absorber and with the item or items of operating data, can be used to estimate the ground components. Based on the ground components, the shape of the landing gear can be used to determine the attachment components.

According to one possibility compatible with the preceding possibilities, each ground and attachment dimensioning envelope comprising dimensioning points that are connected by surfaces, a ground stress point or an attachment stress point situated outside a corresponding dimensioning envelope being a critical point, each dimensioning point being associated with at least one dimensioning component of the landing gear, when it has been determined that a hard landing has been made, said method for detecting a hard landing may comprise, for each critical point: (i) determining a vector linking the critical point and an origin of the associated ground or attachment diagram; (ii) determining a said surface of said corresponding dimensioning envelope traversed by the vector; and (iii) displaying an alert indicating that each component associated with a dimensioning point forming a vertex of the surface traversed by the vector is a mechanical part to be inspected.

Therefore, the method can be used not only to detect a hard landing but also to indicate the components that need to be inspected as a priority.

According to one possibility compatible with the preceding possibilities, each ground and attachment dimensioning envelope comprising dimensioning points that are connected by surfaces, a ground stress point or an attachment stress point situated at a predetermined distance from the corresponding dimensioning envelope being a point at the margin, when the ground stress point is within the ground dimensioning envelope and all the attachment stress points are within the corresponding attachment dimensioning envelope, said method for detecting a hard landing may comprise, for each point at the margin: (i) determining a ray starting from an origin of the associated ground or attachment diagram and passing through the point at the margin; (ii) determining a said surface traversed by the ray; and (iii) displaying an alert indicating that each component associated with a dimensioning point forming a vertex of the surface traversed by the ray is a mechanical part to be inspected.

Therefore, if the landing is not considered to be a hard landing but comprises a stress point close to the associated dimensioning envelope, the method can be used to indicate the components that may need to be inspected for safety reasons.

Apart from a method, the disclosure relates to a system for detecting a hard landing, for detecting if a hard landing is made during a landing phase carried out by an aircraft, the aircraft being provided with a landing gear comprising a contact member coming into contact with the ground during a landing maneuver and at least two connectors connected to a structure of the aircraft, said landing gear comprising a shock absorber containing a fluid.

This system for detecting a hard landing is configured to apply the method for detecting a hard landing.

Therefore, the system for detecting a hard landing may comprise a controller arranged inside or outside the aircraft. Similarly, the system for detecting a hard landing may comprise an alerter in communication with the controller, the alerter being arranged inside or outside the aircraft, for generating audio, visual or haptic alerts or for displaying messages.

Moreover, the system for detecting a hard landing may comprise various sensing devices and, in particular, a temperature sensing device, a pressure sensing device, or an operating data sensing device.

The disclosure also relates to an assembly having an aircraft provided with a landing gear comprising a contact member coming into contact with the ground during a landing maneuver and at least two connectors connected to a structure of the aircraft, said landing gear comprising a shock absorber containing at least one fluid. This assembly is provided with a system for detecting a hard landing, said system for detecting a hard landing being arranged at least partially inside said aircraft.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
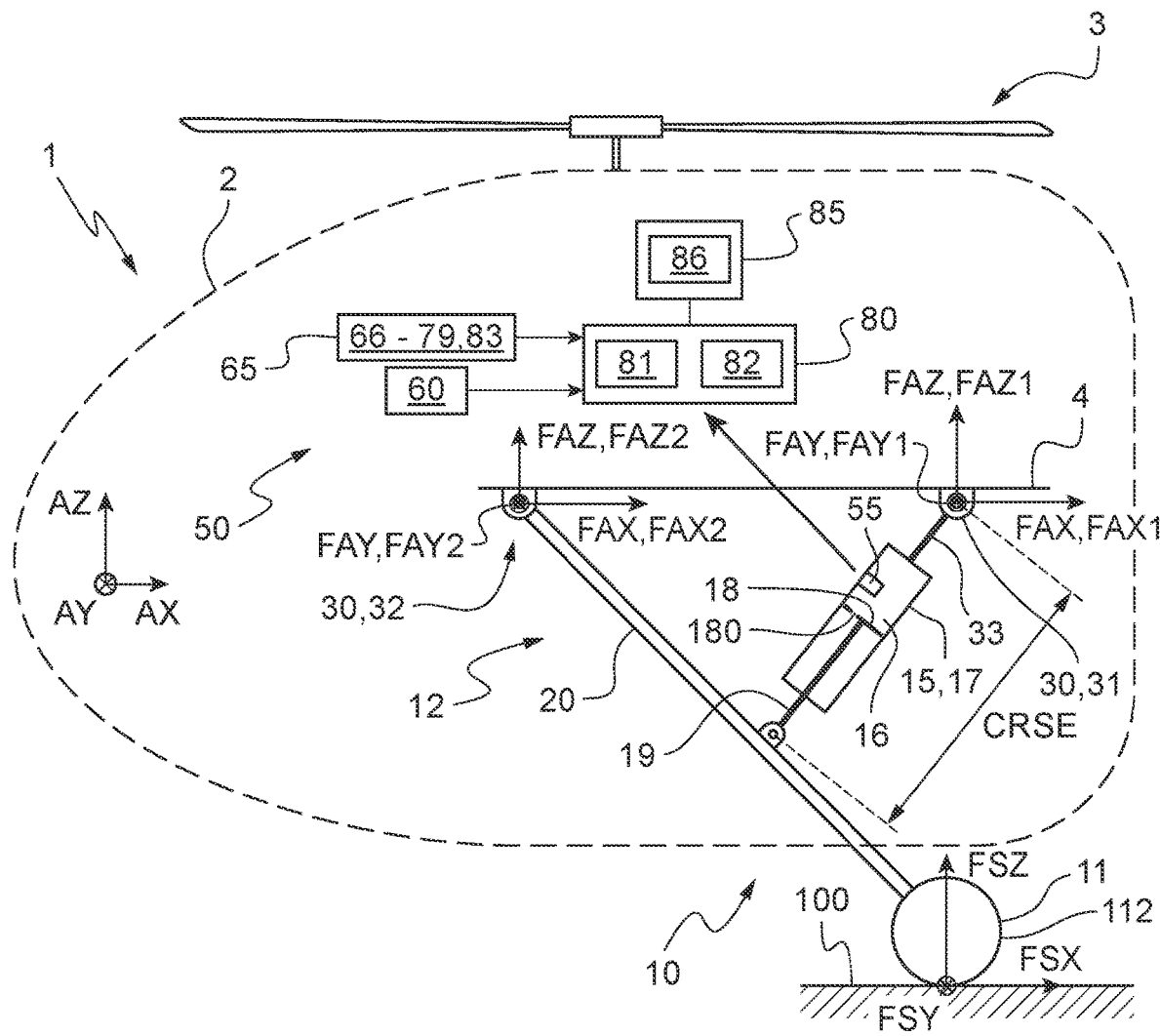
FIG. 1 is a diagram showing a system for detecting a hard landing according to the disclosure, for an aircraft.

Three directions AX, AY and AZ orthogonal to each other are shown in FIG. 1. The direction AX represents a roll axis of the aircraft that is shown. The direction AY represents a pitch axis of the aircraft that is shown and the direction AZ represents a yaw axis of the aircraft that is shown.

FIG. 1 shows an aircraft 1 provided with an airframe 2. This airframe 2 may carry at least one lift rotor 3 contributing in particular to the lift of the aircraft 1. The aircraft 1 may therefore be a rotorcraft.

This aircraft 1 comprises at least one landing gear 10. The landing gear 10 is provided with one or more contact members 11 intended to be in contact with the ground 100 when the aircraft 1 is on the ground. For example, a contact member 11 may comprise a wheel 112, a skid, a ski-type landing gear, etc.

Moreover, the landing gear 10 comprises an installation 12 carrying the contact member or members 11 and comprising at least two connectors 30 connected to a load-bearing structure 4 of the aircraft 1. Reference 30 denotes any connector, and references 31, 32 denote specific connectors as required. The load-bearing structure 4 may comprise a single element connected to the connectors 30 as shown in the example, or several separate elements.

Furthermore, the installation 12 comprises at least one shock absorber 15 containing at least one fluid 16. The fluid 16 is, for example, a liquid, and may in particular be oil. The shock absorber 15 may comprise at least one throttle opening 180, the fluid being capable of passing through this throttle opening. Moreover, the installation 12 may comprise one or more members 20 for guiding, supporting or retracting the contact member 11.

FIG. 1 shows an example of a landing gear 10 to illustrate the disclosure. In this case, the shock absorber 15 comprises a body 17 that accommodates a piston 18 secured to a power rod 19, the power rod 19 protruding out of the body 17 to be hinged to a gear strut 20. The shock absorber 15 is hinged to the structure 4 by a first connector 31. The first connector 31 comprises, for example, a rod 33 secured to the body 17, and a pivot link hinging the rod 33 to the load-bearing structure 4. Moreover, the gear strut 20 carries a wheel 112. The gear strut 20 is hinged by a second connector 32 to the structure 4. The second connector 32 may comprise a pivot that gives the gear strut 20 freedom of movement, relative to the structure 4, only in rotation about an axis.

Irrespective of the embodiment of the landing gear 10, this landing gear 10 therefore comprises at least one contact member 11, a shock absorber 12 housing a fluid 16, and at least two connectors 30 hinged to a load-bearing structure 4 of the aircraft 1.

Moreover, FIG. 1 shows a system 50 for detecting a hard landing configured to automatically determine whether or not a landing is a hard landing, during the landing or after the landing. All or part of this system 50 for detecting a hard landing may be arranged in the aircraft 1.

This system 50 for detecting a hard landing comprises one or more of the following sensing devices. The term "sensing device" denotes a sensor capable of directly measuring the parameter in question but also a system that may comprise one or more sensors or at least one means for processing the signal that makes it possible to provide an estimation of the parameter based on the measurements provided by these physical sensors.

Therefore, the system 50 for detecting a hard landing may comprise one or more conventional force sensing devices 83.

Alternatively, or additionally, the system 50 for detecting a hard landing may comprise one or more sensing devices for, in particular, evaluating the forces experienced at the interfaces of each landing gear. These sensing devices may possibly already be present on an aircraft 1.

Therefore, the system 50 for detecting a hard landing may comprise, for each landing gear, a pressure sensing device 55 measuring a shock absorption pressure of said fluid 16.

The system 50 for detecting a hard landing may comprise a temperature sensing device 60 measuring a temperature inside or outside said shock absorber 15. The temperature sensing device 60 may be arranged on the shock absorber 15, or may measure the temperature of fluid 16, or may be in any other position inside or outside the airframe 2.

Moreover, the system 50 for detecting a hard landing may comprise an operating data sensing device 65 measuring at least one item of operating data of the aircraft 1. The expression "operating data" is to be interpreted in a broad sense and covers data influencing the behavior of the aircraft or the landing gears, such as inertial data or data having an impact on the inertia of the aircraft. Such an item of operating data may be included in an extended list comprising: a roll angle of the aircraft 1, a pitch angle of the aircraft 1, a yaw angle of the aircraft 1, an angular roll speed of the aircraft 1, an angular pitch speed of the aircraft 1, an angular yaw speed of the aircraft 1, a longitudinal acceleration along a roll axis of the aircraft 1, a lateral acceleration along a pitch axis of the aircraft 1, a vertical acceleration along a yaw axis 1, a mass of the aircraft 1, a lift of the aircraft 1, a position of a collective pitch control of the rotor 3 of the aircraft 1, a position of a cyclic pitch control of the rotor 3 of the aircraft 1, a position of the center of gravity of the aircraft 1, an inflation pressure of a tire of the wheel 112 of the landing gear 10, a position of a component of said landing gear 10, a collective pitch angle of blades of a rotor 3 of the aircraft 1, a swashplate angle of a rotor of the aircraft.

Therefore, the operating data sensing device 65 may comprise at least one of the following sensing devices: a roll sensing device 66 measuring a roll angle of the aircraft 1, a pitch sensing device 67 measuring a pitch angle of the aircraft 1, a yaw sensing device 68 measuring a yaw angle of the aircraft 1. For example, an inertial unit acts as a roll sensing device 66, a pitch sensing device 67 and a yaw sensing device 68.

The operating data sensing device 65 may comprise at least one of the following sensing devices: a roll speed sensing device 69 measuring an angular roll speed of the aircraft 1, a pitch speed sensing device 70 measuring an angular pitch speed of the aircraft 1, a yaw speed sensing device 71 measuring an angular yaw speed of the aircraft 1. For example, an inertial unit may be used. A speed sensing device may comprise an acceleration sensing device and an integrator, for example.

The operating data sensing device 65 may comprise at least one of the following sensing devices: a roll acceleration sensing device 72 measuring a longitudinal acceleration along a roll axis of the aircraft 1, a pitch acceleration sensing device 73 measuring a lateral acceleration along a pitch axis of the aircraft 1, a yaw acceleration sensing device 74 measuring a vertical acceleration along a yaw axis of the aircraft 1. For example, these sensing devices may comprise accelerometers.

The operating data sensing device 65 may comprise a mass sensing device 75 measuring a mass of the aircraft 1. The mass sensing device may, for example, comprise a computer calculating a mass of fuel based on the volume of fuel measured using a fuel volume sensing device, the mass of the aircraft 1 being equal to the sum of the mass of fuel, an empty weight and a mass of the payload that is being carried, for example.

The operating data sensing device 65 may comprise a lift sensing device 76 evaluating a lift of the aircraft 1. Such a lift sensing device 76 may comprise a vertical acceleration sensing device measuring a vertical acceleration or a load factor and a computer calculating the lift in a conventional manner as a function of this vertical acceleration.

The operating data sensing device 65 may comprise a pressure sensing device 77 measuring an inflation pressure of a tire of the wheel 112 of said landing gear 10.

The operating data sensing device 65 may comprise at least one position sensing device 78 measuring a position of a component of said landing gear 10 or of a control of the aircraft 1.

The operating data sensing device 65 may comprise at least one blade pitch sensing device 79 measuring a collective pitch angle of blades of a rotor 3 of the aircraft 1.

The operating data sensing device 65 may possibly comprise an angular sensing device 80 measuring information relating to an angle of the swashplate of a rotor of the aircraft, for example in relation to a reference plane. For example, the swashplate may be controlled by several servocontrols. This angular sensing device may therefore comprise sensors measuring a position of a member of each servocontrol and a computer for deducing therefrom said angle of the swashplate of a rotor of the aircraft.

Moreover, the system 50 for detecting a hard landing may comprise a memory 82 storing at least one value of said temperature and successive values of the shock absorption pressure and one or more items of operating data, at least during a landing phase. For example, the temperature measured at the start of a landing phase may be stored.

Moreover, the system 50 for detecting a hard landing comprises a controller 80. The controller 80 may be carried by the airframe 2 or may be remote from the airframe 2. The controller 80 comprises at least one processing unit. Such a processing unit may, for example, comprise at least one processor 81, and at least one storage means, at least one integrated circuit, at least one programmable system, at least one logic circuit, these examples not limiting the scope given to the expression "processing unit". The term "processor" may refer equally to a central processing unit or CPU, a graphics processing unit or GPU, a digital signal processor or DSP, a microcontroller, etc.

The abovementioned memory 82 may belong to the controller 80 according to the example shown.

The controller 80 may be in wired or wireless communication with the force sensing device, the pressure sensing device 55, the temperature sensing device 60 and the operating data sensing device 65, or possibly with the abovementioned memory 82.

The system 50 for detecting a hard landing may moreover comprise an alerter 85 configured to generate an alert after receiving a signal transmitted by the controller 80. The alerter 85 can be used to provide information indicating at least whether a landing has been a hard landing, and to provide information indicating one or more parts to be inspected. The alerter 85 may, for example, comprise a display means 86, such as a screen, a helmet visor, a head-up collimator or the like.

Irrespective of the embodiments of an aircraft 1 and a system 50 for detecting a hard landing provided above, such a system 50 for detecting a hard landing is configured to apply a method for detecting a hard landing according to the disclosure.

This method for detecting a hard landing involves performing successive monitoring cycles PCY during an analysis phase. These successive monitoring cycles PCY may be performed during a landing phase PHASATT as such, according to the example shown, or after landing, using the data measured by the various necessary sensing devices and stored, in particular, during this landing phase PHASATT.

According to one possibility, the controller 80 may be configured, during the design phase, to estimate when the landing phase PHASATT starts.

For example, the method for detecting a hard landing comprises, for each landing gear 10, successive measurements MESVOL with the pressure sensing device. The controller 80 may then be configured to estimate that the landing phase PHASATT has started when a difference between two successive measurements of the shock absorption pressure P of a landing gear exceeds a stored threshold.

When a landing phase is underway, the following steps are carried out during each monitoring cycle PCY, for each landing gear 10.

Each monitoring cycle PCY comprises determining STP1 the components, along three separate and non-coplanar reference axes respectively, of a ground reaction force at an interface between the ground 100 and the contact member 11. These three reference axes are, for example, the roll axis AX, the pitch axis AY and the yaw axis AZ of the aircraft 1. These components are referred to for the sake of convenience as "ground components FSX, FSY, FSZ" and are shown in FIG. 1.

Similarly, each monitoring cycle PCY comprises determining STP2, using the controller 80 and for each connector 30, components, along the three reference axes respectively, of a force applied to this connector 30. These components are referred to as "attachment components" and are shown in FIG. 1. Generally, these attachment components are referenced FAX, FAY, FAZ, while references FAX1, FAY1, FAZ1, FAX2, FAY2, FAZ2 are used to denote specific attachment components as required. According to the example in FIG. 1, the controller 80 is therefore configured to determine three attachment components FAX1, FAY1, FAZ1 at the first connector 31 and three attachment components FAX2, FAY2, FAZ2 at the second connector 32.

According to a first simple possibility, force sensing devices emit measurement signals, that are stored and/or transmitted to the controller, these measurement signals carrying the values of the various ground and attachment components.

According to a second possibility, the method for detecting a hard landing may comprise measuring STPM1, during the current monitoring cycle, using the pressure sensing device 55, the shock absorption pressure P of the fluid 16 of the shock absorber 15.

Moreover, the method for detecting a hard landing may comprise measuring STPM2, during or outside the landing phase, using the temperature sensing device 60, a temperature T inside or outside the shock absorber 15, and measuring STPM3, during the current monitoring cycle, using the operating data sensing device 65, one or more items of operating data DI of the aircraft 1.

Therefore, the controller 80 is configured to determine STPINT, from a stress model M taking into account said temperature T and said shock absorption pressure P and the item or items of operating data DI, the three ground components FSX, FSY, FSZ and the three attachment components FAX, FAY, FAZ at each connector.

For example, the method for detecting a hard landing comprises determining STPINT1, with a movement module M1 of the stress model M applied by the controller 80, a length CRSE of the shock absorber 15 along its compression/extension axis, based on the shock absorption pressure P and the temperature T. For example, the length CRSE is the distance separating two articulation axes of the shock absorber, respectively at the gear strut 20 and at the structure 4 according to the example shown. This length CRSE increases when the shock absorber 15 extends and decreases when the shock absorber 15 is compressed. Moreover, the controller 80 may be configured to determine, during a step STPINT2, using a stress module M2 of the stress model M, ground components FSX, FSY, FSZ, based on the length CRSE and the shock absorption pressure P and at least one item of operating data DI. Finally, the controller 80 may be configured to determine, during a step STPINT3, using a transformation module M3 of the stress model M, attachment components FAX1, FAY1, FAZ1, FAX2, FAY2, FAZ2, based on the ground components FSX, FSY, FSZ.

Each module may, for example, be in the form of one or more mathematical laws established by tests, calculations or simulations, or an artificial intelligence device such as a neural network, for example.

Figure 3:
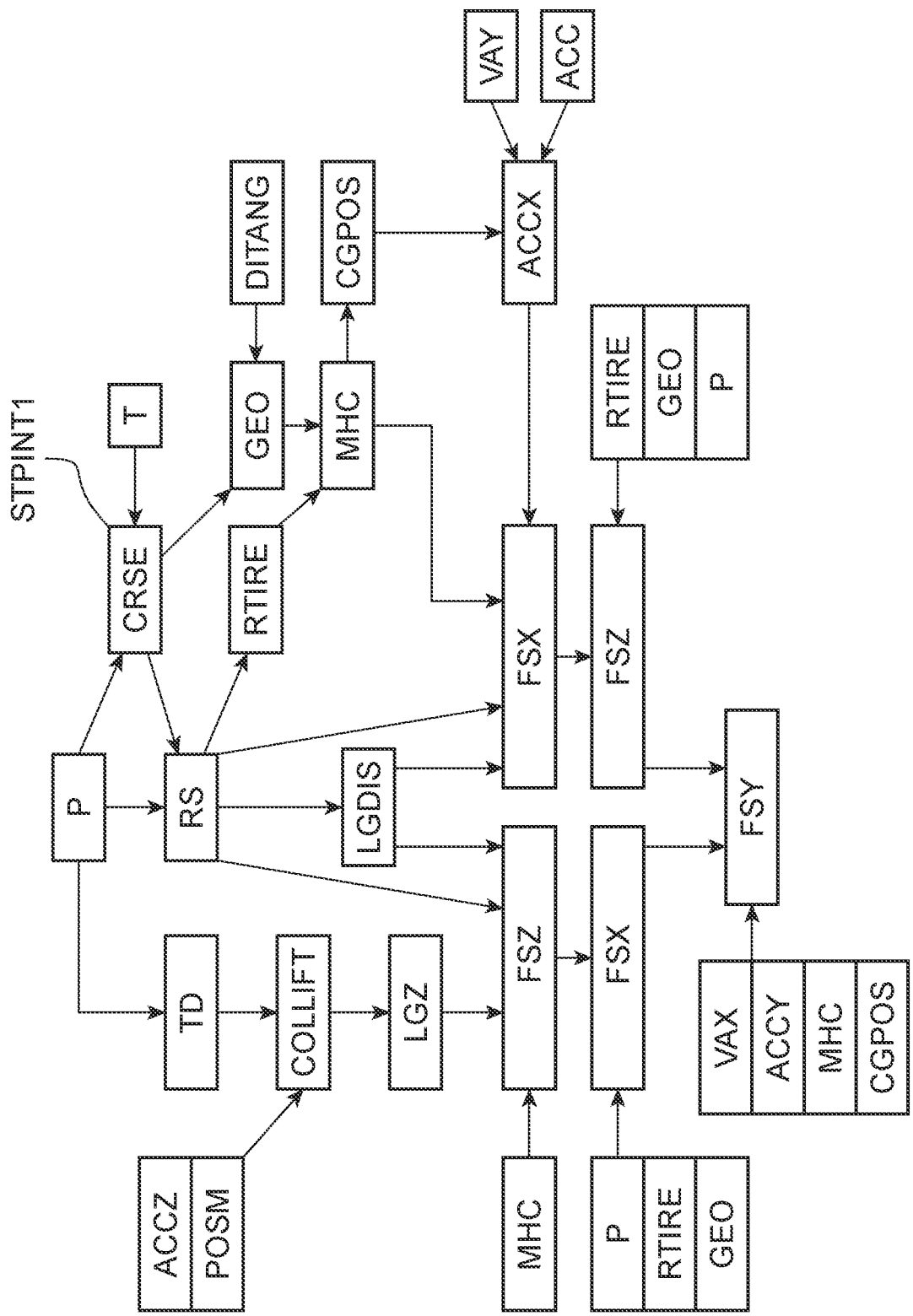
FIG. 3 is a diagram showing a stress model according to the disclosure.

FIG. 3 shows examples of a stress model that can be used to calculate the ground components.

Based on the shock absorption pressure P measured using the pressure sensing device 55 and the temperature T measured using the temperature sensing device 60, the stress model is configured to calculate the length CRSE of the shock absorber 15.

Based on the shock absorption pressure P and the length CRSE, the controller 80 may be configured to calculate a loading force RS applied to the shock absorber 15 along the compression/extension axis of the shock absorber 15.

Optionally, the controller can 80 evaluate the distribution LGDIS of the stresses at each landing gear 10 of the aircraft 1 based on the loading stresses at each landing gear 10, for verification purposes, for example. For each landing gear 10, this distribution may be equal to the quotient of the loading stress of this landing gear 10 divided by the sum of the loading stresses.

At the same time, based on the loading force RS, the controller 80 can evaluate the radius RTIRE of a tire of the wheel 112 of this landing gear 10, using a stored predetermined law. Furthermore, the controller 80 can evaluate a shape GEO of the landing gear 10 based on the length CRSE and operating data DI, in particular a pitch angle DITANG of the aircraft 1 measured using the pitch sensing device 67. The shape GEO denotes the geometric shape of the landing gear and its positioning in relation to the ground, i.e., for example, the coordinates of the components of the landing gear in a reference frame attached to the ground.

The controller 80 may therefore be configured to deduce, from the radius RTIRE and this shape GEO obtained for each landing gear, a mass MHC of the aircraft 1.

Alternatively, this mass may be evaluated using a mass sensing device.

Therefore, according to a first example of the stress model, the controller 80 can determine the ground roll component FSX, that is conventionally referred to as the longitudinal ground component. The controller 80 deduces therefrom the ground yaw component FSZ, that is conventionally referred to as the vertical ground component, then the ground pitch component FSY, that is conventionally referred to as the lateral ground component.

The controller 80 can therefore deduce, from this mass MHC, a position CGPOS of the center of gravity of the aircraft 1 along the yaw axis, then a longitudinal acceleration ACCX of the aircraft 1 at its center of gravity and along the roll axis, based on this position CGPOS of the center of gravity of the aircraft 1 along the yaw axis, and an angular pitch speed VAY measured using the pitch speed sensing device 70 and the longitudinal acceleration ACC of the aircraft 1 along the roll axis measured using the roll acceleration sensing device 72.

Moreover, the controller 80 may be configured to deduce the ground component FSX along the roll axis based on the loading force RS, the mass MHC of the aircraft 1 and the longitudinal acceleration ACCX of the aircraft 1 at the center of gravity and along the roll axis. The controller 80 is configured to deduce therefrom the ground yaw component FSZ, possibly taking into consideration the radius RTIRE and the shock absorption pressure P and the shape GEO, then the ground component FSY along the pitch axis, based on the mass MHC of the aircraft 1, the position CGPOS of the center of gravity of the aircraft 1 along the yaw axis, or the angular roll speed VAX of the aircraft 1 measured using the roll speed sensing device 69 and the acceleration ACCY of the aircraft along the pitch axis measured using the pitch acceleration sensing device 73.

Additionally, or alternatively, a second example of a stress model may be used to determine the ground yaw component FSZ, in order to deduce therefrom the ground roll component FSX and then the ground pitch component FSY.

The controller 80 is therefore configured to evaluate whether the aircraft 1 has touched down TD. Furthermore, the controller 80 is configured to determine a law COLLIFT providing lift as a function of a position of a collective pitch control of the blades of the rotor 3 measured using the position sensing device 78 during a measurement step POSM extending over a predetermined period before the aircraft 1 touches down, and a vertical acceleration ACCZ of the aircraft 1 along the yaw axis measured using the yaw acceleration sensing device 74 during the predetermined period.

After touchdown, the controller 80 is configured to evaluate a force LGZ along the yaw axis as a function of the vertical acceleration ACCZ of the aircraft 1, the position of the collective pitch control of the blades of the rotor 3 and the law COLLIFT.

Moreover, the controller 80 may be configured to deduce therefrom the ground component FSZ along the yaw axis, using the abovementioned mass MHC. The controller 80 may be configured to deduce therefrom the ground component FSX along the roll axis using the shock absorption pressure P, the radius RTIRE and the abovementioned shape GEO. The controller 80 may be configured to deduce the ground component FSY along the pitch axis, based on the mass MHC of the aircraft 1, the position CGPOS of the center of gravity of the aircraft 1 along the yaw axis, or the angular roll speed VAX of the aircraft 1 measured using the roll speed sensing device 69 and the acceleration ACCY of the aircraft along the pitch axis measured using the pitch acceleration sensing device 73.

The ground components determined via the two described examples may possibly be compared, in order to fine-tune the results using known techniques, or even to trigger a malfunction alert in the event of differences exceeding a threshold.

Irrespective of how the ground and attachment components are evaluated, during each monitoring cycle PCY, the controller 80 is configured to deduce whether the landing under consideration is a hard landing, based on the ground and attachment components.

Figure 2:
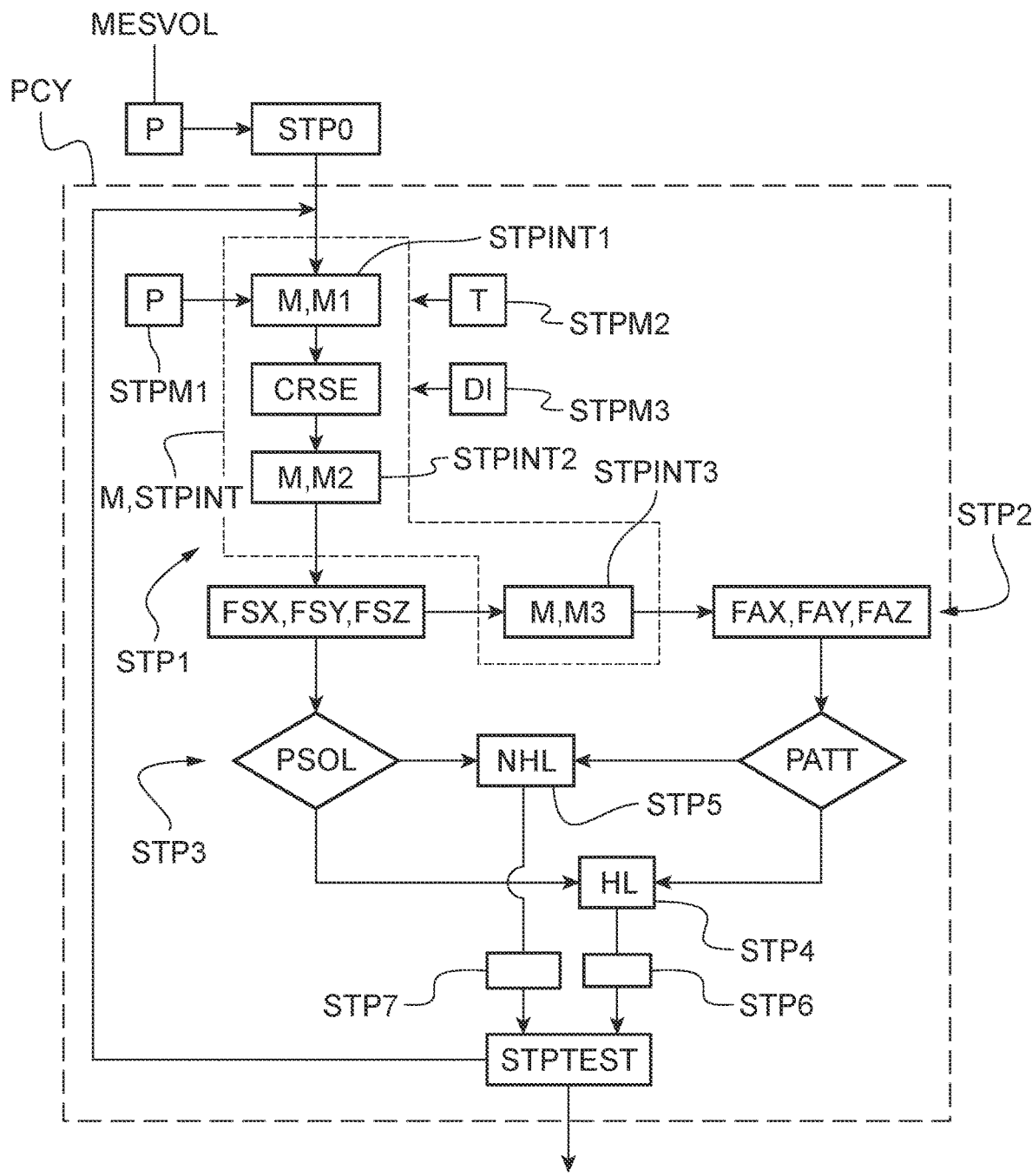
FIG. 2 is a diagram showing a method for detecting a hard landing.

Therefore, and in reference to FIG. 2, the method for detecting a hard landing comprises determining STP3, using the controller 80, whether a ground stress point PSOL having as coordinates the three ground components FSX, FSY, FSZ in a ground diagram lies within or outside a volume delimited by a ground dimensioning envelope 200 predetermined. Moreover, the controller determines, for each connector 30, whether an attachment stress point PATT having as coordinates the three corresponding attachment components in an attachment diagram lies within or outside the volume delimited by a predetermined attachment dimensioning envelope 300 specific to this connector 30.

Figure 4:
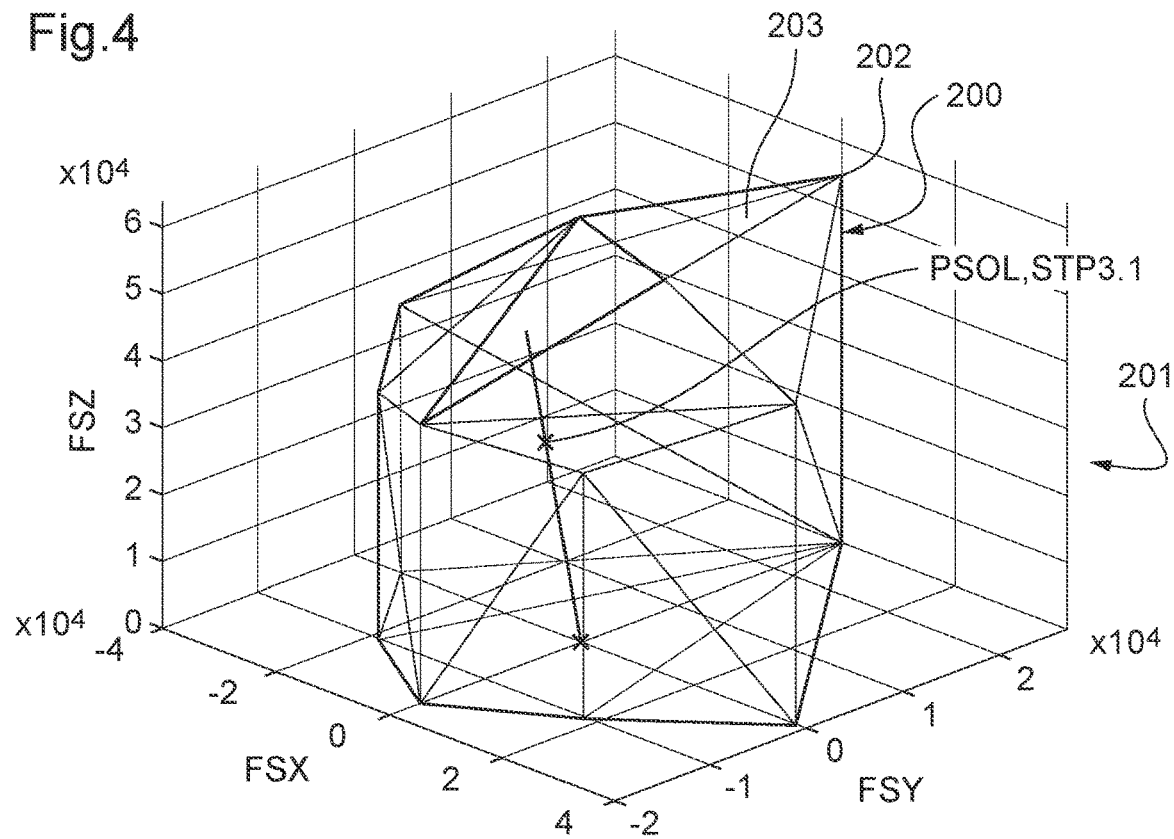
FIG. 4 is a ground diagram containing a ground stress point present within a ground dimensioning envelope.

FIG. 4 shows a ground dimensioning envelope 200 in a three-dimensional diagram referred to for the sake of convenience as a "ground diagram 201".

Therefore, the ground dimensioning envelope 200 comprises points referred to for the sake of convenience as "ground dimensioning points 202". These ground dimensioning points 202 are connected by surfaces referred to as "ground surfaces 203". The ground surfaces 203 may be planar, the ground dimensioning envelope 200 then being a polyhedron. Each ground dimensioning point 202 may be established by at least a simulation, a calculation or a test. Each ground dimensioning point 202 has, as coordinates in the ground diagram 201, the components along the three reference axes AX, AY, AZ of the maximum force experienced by the landing gear at the interface between the contact member 11 and the ground 100 during a predetermined limit landing scenario.

Therefore, the method for detecting a hard landing may comprise determining STP3.1, using the controller 80, whether the ground stress point PSOL has as coordinates the three ground components FSX, FSY, FSZ in the ground diagram 201, in order to evaluate where this ground stress point PSOL is situated in relation to the associated ground dimensioning envelope 200.

Figure 5:
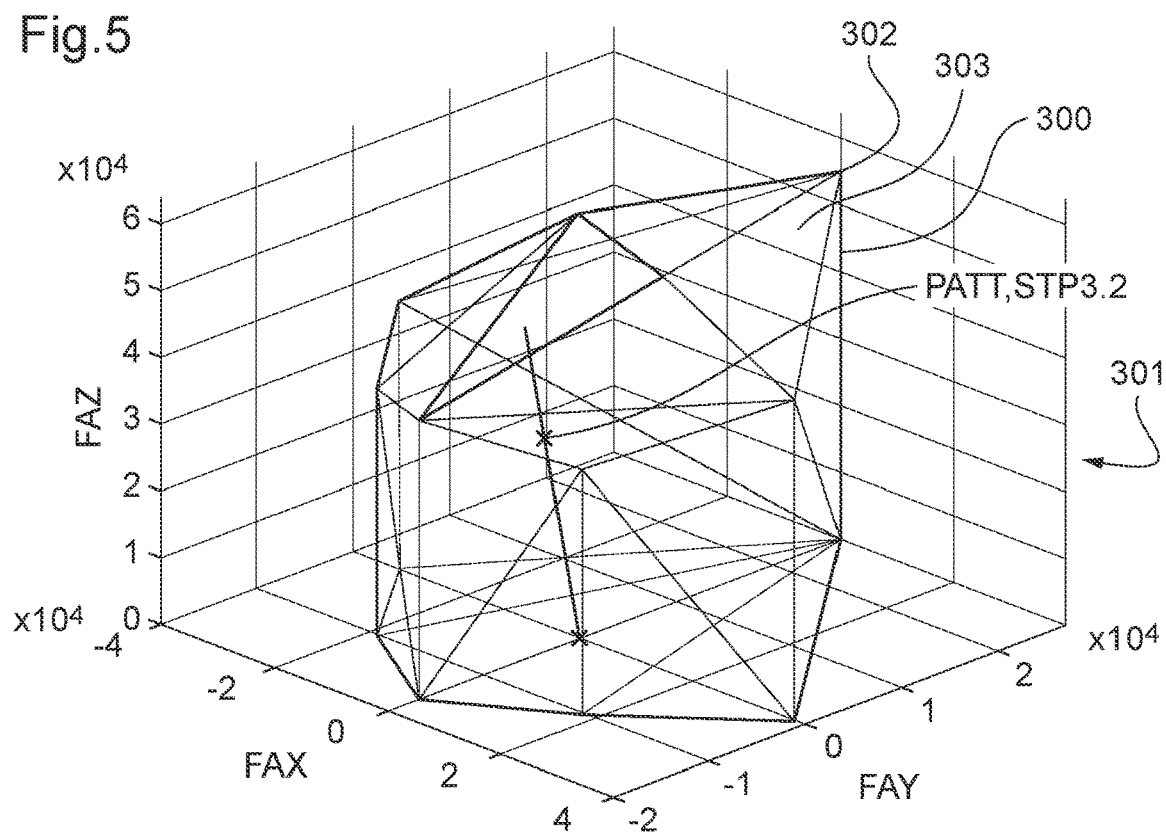
FIG. 5 is an attachment diagram containing an attachment stress point present within an attachment dimensioning envelope.

FIG. 5 shows an attachment dimensioning envelope 300 in a three-dimensional diagram referred to for the sake of convenience as an "attachment diagram 301".

Therefore, the attachment dimensioning envelope 300 comprises points referred to as "attachment dimensioning points 302". These attachment dimensioning points 302 are connected by surfaces referred to as "attachment surfaces 303". The attachment surfaces 303 may be planar, the attachment dimensioning envelope 300 then being a polyhedron. Each attachment dimensioning point 302 may be established by at least a simulation, a calculation or a test. Each attachment dimensioning point 302 has, as coordinates in the attachment diagram 301, the components along the three reference axes AX, AY, AZ of the maximum force experienced by the connector 30 in question during a predetermined limit landing scenario.

Therefore, the method for detecting a hard landing may comprise determining STP3.1, using the controller 80, whether the attachment stress point PATT has as coordinates the three associated attachment components FAX, FAY, FAZ in the attachment diagram in order to evaluate where this attachment stress point PATT is situated in relation to the associated attachment dimensioning envelope 300.

In reference to FIG. 2, the method for detecting a hard landing comprises determining STP4, using the controller 80, that a hard landing has been made when at least the ground stress point PSOL lies outside the ground dimensioning envelope 200 or at least one attachment stress point PATT lies outside the corresponding attachment dimensioning envelope 300. This step may be performed during each monitoring cycle or at the end of the monitoring cycles.

Therefore, if during a monitoring cycle the ground components FSX, FSY, FSZ place a ground stress point PSOL outside the ground dimensioning envelope 200 in the ground diagram, the controller 80 estimates that the landing is a hard landing, regardless of the positions of the other stress points. FIG. 5 shows such a situation.

Similarly, if during a monitoring cycle the attachment components FAX, FAY, FAZ place an attachment stress point PATT outside the corresponding attachment dimensioning envelope 300 in the attachment diagram in question, the controller 80 estimates that the landing is a hard landing, regardless of the positions of the other stress points.

Optionally, the method for detecting a hard landing comprises generating HL a maintenance alert with an alerter 85 when it has been determined that a hard landing has been made. An alert may possibly only be emitted at the end of the method for detecting a hard landing if at least one ground PSOL or attachment PATT stress point was outside the associated dimensioning envelope 200, 300.

If appropriate, when it has been determined that a hard landing has been made, the method for detecting a hard landing may comprise examining STP6 each critical point in order to evaluate which mechanical part of the landing gear 10 needs to be inspected as a priority. The expression "mechanical part" denotes any element liable to be damaged, for example by undergoing plastic deformation during a hard landing. By way of illustration, a mechanical part may be in the form of a screw, a gear strut, a component of a shock absorber 15, a component of a connector 30 and, for example, a flange of a clevis or a pivot pin, a spindle of a wheel, a bearing, etc.

A critical point is a ground stress point PSOL situated outside a ground dimensioning envelope 200 in the ground diagram 201, or an attachment stress point PATT situated outside the corresponding attachment dimensioning envelope 300 in the attachment diagram 301 in question.

Figure 6:
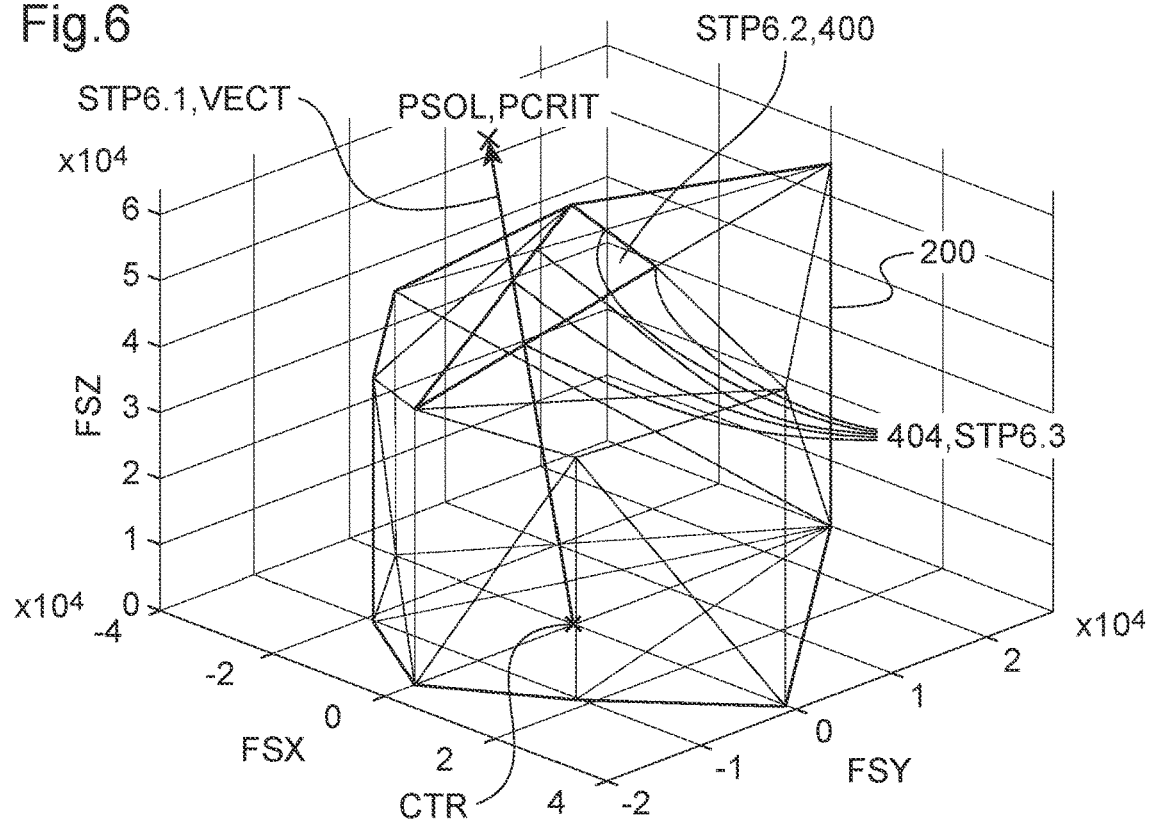
FIG. 6 is a ground diagram containing a ground stress point present outside a ground dimensioning envelope.

In reference to FIG. 6, this examination STP6 comprises determining STP6.1, using the controller 80, a vector VECT linking the critical point and an origin CTR of the associated diagram 201, 301, that is the ground diagram 201 in the example shown. Moreover, the controller 80 is configured to determine STP6.2 a surface 400 of the dimensioning envelope 200, 300 that is considered to be traversed by the vector VECT. The controller 80 next transmits a control signal to the alerter 85 to request it to display STP6.3 an alert indicating that each component associated with a dimensioning point 404 forming a vertex of the surface 400 traversed by the vector VECT is a mechanical part to be inspected.

To this end, the memory 82 may store, for each dimensioning point, the mechanical part or parts to be inspected. The controller 80 or the alerter 85 is configured to consult this memory 82 and determine the mechanical part or parts to be inspected.

In reference to FIG. 3, the method for detecting a hard landing may comprise determining STP5, using the controller 80, that a normal landing has been made when no ground stress point PSOL lies outside the ground dimensioning envelope 200 and no attachment stress point PATT lies outside the corresponding attachment dimensioning envelope 300.

The method for detecting a hard landing possibly comprises generating NHL a normality alert with the alerter 85 when no ground stress point PSOL lies outside the ground dimensioning envelope 200 and no attachment stress point PATT lies outside the corresponding attachment dimensioning envelope 300.

Figure 7:
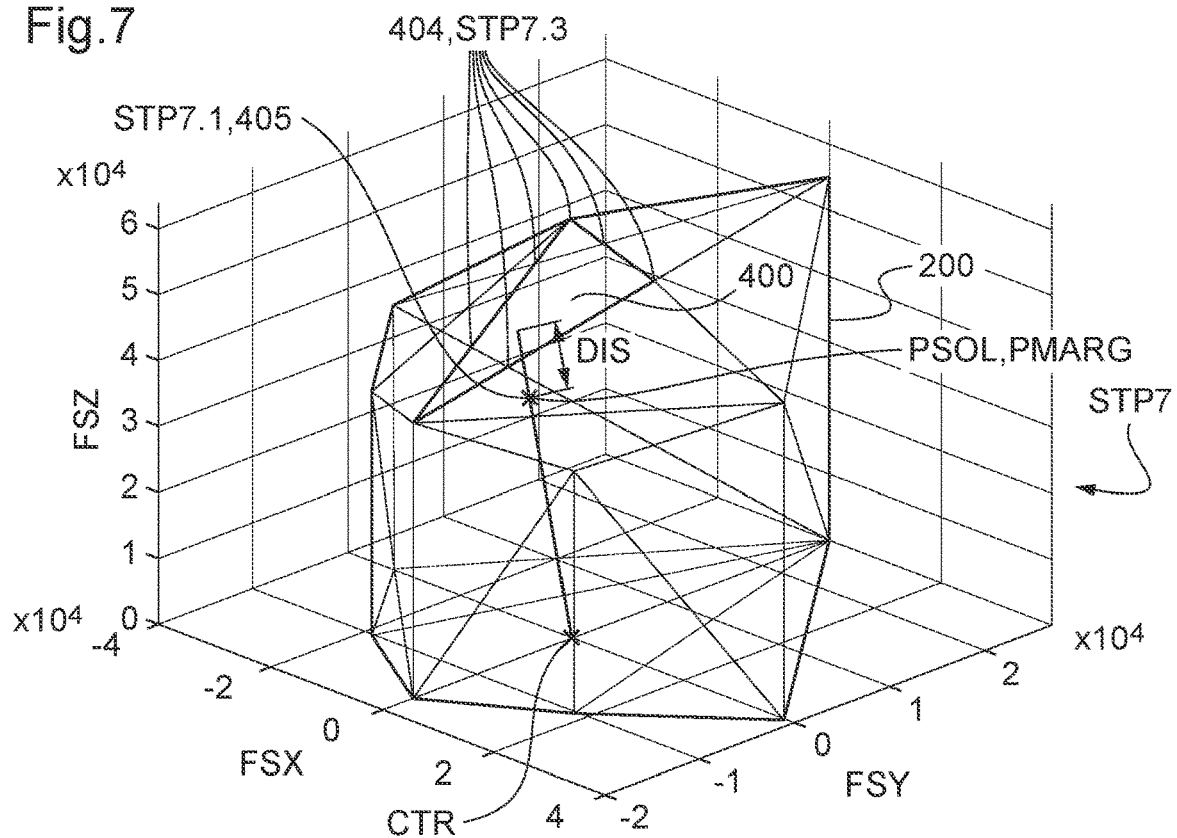
FIG. 7 is a ground diagram containing a ground stress point present within a ground dimensioning envelope and representing a point at the margin.

If appropriate, and in reference to FIG. 7, when it has been determined that a normal landing has been made, the method for detecting a hard landing may comprise examining STP7 each point at the margin PMARG in order to evaluate which mechanical part of the landing gear needs to be inspected as a priority.

A point at the margin PMARG is a ground stress point PSOL situated within the ground dimensioning envelope 200 at a distance DIS less than a threshold distance from this ground dimensioning envelope 200, or an attachment stress point PATT situated within the corresponding attachment dimensioning envelope 300 at a distance DIS less than a threshold distance from this attachment dimensioning envelope 300.

Therefore, the controller 80 is configured to determine whether a ground PSOL or attachment PATT stress point is a point at the margin PMARG. In reference to FIG. 7, pour each point at the margin PMARG, the controller 80 is configured to determine STP7.1 a ray 405 starting from an origin CTR of the associated diagram 201, 301 and passing through the point at the margin PMARG. Moreover, the controller 80 is configured to determine STP7.2 a surface 400 traversed by the ray 405. The controller 80 next transmits a control signal to the alerter 85 to request it to display STP7.3 an alert indicating that each component associated with a dimensioning point 404 forming a vertex of the surface 400 traversed by the ray 405 is a mechanical part to be inspected.

In reference to FIG. 3, at the end of a monitoring cycle, the controller 80 may be configured to determine whether the landing phase PHASATT has ended. For example, the controller 80 is configured to estimate, during a test step STPTEST, whether each landing gear of said at least one landing gear is resting on the ground, and whether said shock absorption pressure for each landing gear is greater than a stored or calculated test threshold. If so, the method for detecting a hard landing is has ended. If not, a new monitoring cycle is performed.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for detecting a hard landing, for detecting if a hard landing is made during a landing phase carried out by an aircraft, the aircraft being provided with at least one landing gear comprising a contact member coming into contact with the ground during a landing maneuver and at least two connectors connected to a structure of the aircraft, the landing gear comprising at least one shock absorber containing at least one fluid, wherein the method for detecting a hard landing comprises carrying out a series of monitoring cycles, each monitoring cycle comprising the following steps:

determining, using a controller, three ground components of a ground reaction force at an interface between the ground and the contact member and along three separate and non-coplanar reference axes respectively, and determining, for each connector, three attachment components of a force applied to this connector along the three reference axes respectively;

determining, using the controller, whether a ground stress point defined by the three ground components lies within or outside a ground volume delimited by a ground dimensioning envelope in a three-dimensional ground diagram, and, for each connector, whether an attachment stress point defined by the three corresponding attachment components lies within or outside an attachment volume delimited by an attachment dimensioning envelope in a three-dimensional attachment diagram specific to it; and determining that a hard landing has been made when at least the ground stress point lies outside the ground dimensioning envelope or at least one attachment stress point lies outside the corresponding attachment dimensioning envelope.

2. The method for detecting a hard landing according to claim 1, wherein the method for detecting a hard landing comprises determining, using the controller, whether the ground stress point has as coordinates the three ground components in the three-dimensional ground diagram and, for each connector, determining, using the controller, whether the associated attachment stress point has as coordinates the three associated attachment components in the three-dimensional attachment diagram specific to the connector in question.

3. The method for detecting a hard landing according to claim 1, wherein the method for detecting a hard landing comprises generating a maintenance alert with an alerter when determining that a hard landing has been made or generating a normality alert with the alerter when no ground stress point lies outside the ground dimensioning envelope and no attachment stress point lies outside the corresponding attachment dimensioning envelope.

4. The method for detecting a hard landing according to claim 1, wherein the three reference axes are a roll axis of the aircraft, a pitch axis of the aircraft and a yaw axis of the aircraft.

5. The method for detecting a hard landing according to claim 1, wherein the method for detecting a hard landing comprises successive measurements, during flight and with a pressure sensing device, of a shock absorption pressure of the fluid, the controller being configured to estimate that the landing phase begins when a relative difference between two successive measurements of the shock absorption pressure exceeds a trigger threshold.

6. The method for detecting a hard landing according to claim 1, wherein the method for detecting a hard landing comprises measuring, with a pressure sensing device, a shock absorption pressure of the fluid during the landing phase, the controller being configured to estimate that the landing phase has ended when:

each landing gear of the at least one landing gear is resting on the ground; and the shock absorption pressure for each landing gear of the at least one landing gear is greater than a test threshold that is stored or calculated for a reference period.

7. The method for detecting a hard landing according to claim 1, wherein the ground dimensioning envelope comprises ground dimensioning points and each attachment dimensioning envelope comprises attachment dimensioning points, each ground dimensioning point representing a maximum force experienced at an interface between the contact member and the ground during a limit landing scenario, and, for each connector, each attachment dimensioning point representing a maximum force experienced by the connector in question during the limit landing scenario.

8. The method for detecting a hard landing according to claim 1, wherein determining, using a controller, of three ground components and three attachment components for each connector comprise the following steps:

during the current monitoring cycle, measuring, using a pressure sensing device, a shock absorption pressure of the fluid;

during or outside the landing phase, measuring, using a temperature sensing device, a temperature inside or outside the shock absorber;

during the current monitoring cycle, measuring, using an operating data sensing device, one or more items of operating data of the aircraft; and using the controller, determining, from a stress model taking into account the temperature and the shock absorption pressure and the item or items of operating data, the three ground components and the three attachment components for each connector.

9. The method for detecting a hard landing according to claim 8, wherein the item of items of operating data are included in an extended list comprising: a roll angle of the aircraft, a pitch angle of the aircraft, a yaw angle of the aircraft, an angular roll speed of the aircraft, an angular pitch speed of the aircraft, an angular yaw speed of the aircraft, a longitudinal acceleration along a roll axis of the aircraft, a lateral acceleration along a pitch axis of the aircraft, a vertical acceleration along a yaw axis of the aircraft, a mass of the aircraft, a lift of the aircraft, a position of a collective pitch control of a rotor of the aircraft, a position of a cyclic pitch control of a rotor of the aircraft, a position of the center of gravity of the aircraft, an inflation pressure of a tire of the landing gear, a position of a component of the landing gear, a collective pitch angle of blades of a rotor of the aircraft, a swashplate angle of a rotor of the aircraft.

10. The method for detecting a hard landing according to claim 8,
wherein determining, from a stress model, of the three ground components and the three attachment components for each connector comprises: (a) determining, with a movement module of the stress model applied by the controller, a length of the shock absorber based on the shock absorption pressure and the temperature; and (b) determining, with a stress module of the stress model, the ground components based on the length and the shock absorption pressure and at least one the item of operating data; and (c) determining, with a transformation module of the stress model, the attachment components based on the ground components.

11. The method for detecting a hard landing according to claim 1,
wherein, each ground and attachment dimensioning envelope comprising dimensioning points that are connected by surfaces, a ground stress point or an attachment stress point situated outside a corresponding dimensioning envelope being a critical point, each dimensioning point being associated with at least one component of the landing gear, when it has been determined that a hard landing has been made, the method for detecting a hard landing comprises, for each critical point: (i) determining a vector linking the critical point and an origin of the associated ground or attachment diagram; (ii) determining a surface of the corresponding dimensioning envelope traversed by the vector; and (iii) displaying an alert indicating that each component associated with a dimensioning point forming a vertex of the surface traversed by the vector is a mechanical part to be inspected.

12. The method for detecting a hard landing according to claim 1,
wherein, each ground and attachment dimensioning envelope comprising dimensioning points that are connected by surfaces, a ground stress point or an attachment stress point situated at a predetermined distance from the corresponding dimensioning envelope being a point at the margin, when the ground stress point is within the ground dimensioning envelope and all the attachment stress points are within the corresponding attachment dimensioning envelope, for each point at the margin: (i) determining a ray starting from an origin of the associated ground or attachment diagram and passing through the point at the margin; (ii) determining the surface traversed by the ray; and (iii) displaying an alert indicating that each component associated with a dimensioning point forming a vertex of the surface traversed by the ray is a mechanical part to be inspected.

13. A system for detecting a hard landing, for detecting if a hard landing is made during a landing phase carried out by an aircraft, the aircraft being provided with a landing gear comprising a contact member coming into contact with the ground during a landing maneuver and at least two connectors connected to a structure of the aircraft, the landing gear comprising at least one shock absorber containing a fluid,
wherein the system for detecting a hard landing is configured to apply the method according to claim 1 and comprises:
a temperature sensing device, a pressure sensing device for detecting a shock absorption pressure of the fluid, an operating data sensing device;
a controller configured to determine three ground components of a ground reaction force at an interface between the ground and the contact member and along three separate and non-coplanar reference axes respectively, and determine, for each connector, three attachment components of a force applied to this connector along the three reference axes respectively;
the controller being configured to determine whether a ground stress point defined by the three ground components lies within or outside a ground volume delimited by a ground dimensioning envelope in a three-dimensional ground diagram, and, for each connector, whether an attachment stress point defined by the three corresponding attachment components lies within or outside an attachment volume delimited by an attachment dimensioning envelope in a three-dimensional attachment diagram specific to it; and
the controller being configured to determine that a hard landing has been made when at least the ground stress point lies outside the ground dimensioning envelope or at least one attachment stress point lies outside the corresponding attachment dimensioning envelope.

14. An assembly having an aircraft provided with a landing gear comprising a contact member coming into contact with the ground during a landing maneuver, at least two connectors connected to a structure of the aircraft, and a shock absorber containing at least one fluid,
wherein the assembly is provided with the system for detecting a hard landing according to claim 13, the system for detecting a hard landing being arranged at least partially inside the aircraft.

* * * * *